310-335 SR

XR 3,914,718

United St[...]

Puyhaubert et

[11] 3,914,718

[45] Oct. 21, 1975

[54] LONG-DELAY ELECTROACOUSTIC LINE

[75] Inventors: Jean Puyhaubert; Michel Seguin, both of Paris, France

[73] Assignee: Societe Lignes Telegraphiques et Telephoniques, Paris, France

[22] Filed: July 16, 1974

[21] Appl. No.: 489,057

[30] Foreign Application Priority Data

July 30, 1973 France .......................... 73.27744
Aug. 14, 1973 France .......................... 73.29619

[52] U.S. Cl. .................. 333/30 R; 310/9.5; 310/9.6
[51] Int. Cl.$^2$. H03H 9/26; H03H 9/30; H01L 41/10
[58] Field of Search ......... 333/30 R, 72; 310/8, 8.1, 310/8.2, 8.3, 8.4, 9.1, 9.5, 9.6, 9.7, 9.8

[56] References Cited

UNITED STATES PATENTS

| | | | |
|---|---|---|---|
| 2,549,872 | 4/1951 | Willard | 310/8.2 UX |
| 3,317,861 | 5/1967 | Kompfner | 333/30 R |
| 3,317,862 | 5/1967 | Fitch | 333/30 R |
| 3,582,834 | 6/1971 | Evans | 333/30 R |
| 3,832,655 | 8/1974 | Yokoyama | 333/30 R |

*Primary Examiner*—James W. Lawrence
*Assistant Examiner*—Marvin Nussbaum
*Attorney, Agent, or Firm*—Kemon, Palmer & Estabrook

[57] ABSTRACT

In a multi-reflection bulk longitudinal wave delay line of generally cylindrical shape, in which focusing is achieved by means of reflection by at least one off-centered sphere portion shaped dioptric system. The reflected echos are thereby spread on the output transducer for easier selection of high rank echos. Preferably the acoustic wave is propagated on at least part of its path according to transverse shear mode, focusing being achieved on the part of the path where the waves propagate according to longitudinal mode.

6 Claims, 11 Drawing Figures

3914718
OR IN 333/30R

LONG-DELAY ELECTROACOUSTIC LINE

BACKGROUND OF THE INVENTION

The present invention concern a bulk wave acoustic delay line for very high frequencies, designed in order to provide a delay of several tens of microseconds with reduced overall dimensions, while introducing an attenuation which is compatible with the use of the delayed signal.

As is well known, this type of delay line comprises essentially two transducers which perform respectively the transformation of the electromagnetic wave into an acoustic wave and the reciprocal transformation, in association with a generally crystalline medium in which the acoustic wave is propagated at a speed which is very low as compared with the speed of light. The two transducers are sometimes reduced to one, a total reflection of the acoustic wave taking place at the terminal face of the medium serving for the propagation. Under these conditions,, the delay corresponds to the duration of a forward and backward travel in the medium. Since the duration of the travel is proportional to the length of the distance travelled in the medium, a line operating with reflection provides a delay which is double that of a line of like dimensions operating by transmission. However, even in this case, for delays of more than 50 μs the crystalline medium would have to be too long for practical application. In order to fix ideas, it may be recalled by way of example that for a wave travelling along the axis C in a corundum rod, the delay is 1 μs for a travel of about 11.2 mm. A delay of 50 μs would necessitate a rod of the order of 0.5 m, which is obviously impracticable, both for technological reasons and for reasons of cost. In order to increase the delay imparted by a line, instead of using the echo which has undergone a reflection at the end of the propagation medium, it has been proposed to use the wave which has undergone multiple reflections, that is to say, one which has performed a number of forward and backward travels in the medium.

PRIOR ART

In order to reduce the energy losses of the wave in the crystal, which are due notably to parasitic reflections on the edges resulting from the dispersion, it has been proposed, e.g. in U.S. Pat. Nos. 3,317,861 and 3,317,862, filed on the Sept. 11, 1964, by Bell Laboratories, to use at least one focusing reflecting surface which effects a concentration of the acoustic wave at each reflection in accordance with the laws of geometrical optics.

U.S. Pat. No. 3,317,861 describes a structure with an axis of revolution which has a plane terminal face on which there is located an off-centered input transducer (not on the axis of revolution of the structure). The opposite spherical face ensures focusing of the elastic wave at a point of the input face. The output transducer is disposed on the same input face at the point corresponding to the impact of the wave after the number of focusing reflections corresponding to the desired delay.

U.S. Pat. No. 3,317,862 describes a structure of revolution which has two spherical terminal faces of like curvature, the distance between which is different from the focal distance of the spherical mirrors formed by the terminal faces. Two transducers are provided, the line operating either by reflection or by transmission, after multiple reflections on the spherical faces. In one embodiment, one of the faces consists of two spherical portions disposed side by side with their axes parallel to the axis of the volume constituted by the other terminal face and the lateral face.

The operation of these lines is explained in detail in the two aforesaid specifications by analogy with that of mirrors.

BRIEF SURVEY OF THE INVENTION

The present invention relates to a new multiple-reflection delay line which is essentially characterized in that the propagation medium of generally cylindrical form is terminated by at least one face, the axis of symmetry of which is not parallel to the axis of symmetry of the cylinder and which includes at least one focusing face. The two faces which delimit the acoustic path are preferably focusing, and more particularly sperical, the line of the centers of the spherical portions being different from the axis of symmetry of the cylinder. This feature allows spreading of the points of impact of the reflected waves on the terminal faces and the selection of the echos of high order is facilitated. The focusing of the acoustic wave induces a relation between the length of the medium of propagation fixed by the delay to be obtained and the focal length of the dioptric systems constituting the reflecting faces, that is to say, between the radius of curvature of the spheres and the geometrical length of the medium. Since the transducer emits a plane wave (beam of parallel rays), the maximum concentration after the first reflection is obtained at the image focus of the first reflecting face. The distance of this focus from the apex of the mirror is equal to half the radius of curvature of the latter, as is well known. If the second terminal face is disposed in the neighbourhood of the focus, the concentrating effect is maximised. However, this condition is not essential, since the effect of concentration is obtained for any length smaller than half the radius of curvature. If the second reflecting face is planar, a concentration effect can altogether still be obtained. The same is the case if the two faces are focusing and have the same radius of curvature. However, this condition may necessitate the medium having too large a cross-section owing to the distance between the points of impact of the reflected beams. If different radii of curvature are used and these radii are so chosen that the following condition is satisfied:

$$\frac{2}{e} = \frac{1}{R_1} + \frac{1}{R_2} \qquad (1)$$

where $R_1$ and $R_2$ are the radii of curvature and $e$ is the length of the medium in the direction of its axis of revolution, optimum results are obtained. This relation can be compared to the equation of conjugation of spherical mirrors. However, the focusing effect is obtained for any value of $e$ lower than the optimum value defined by (1) and for slightly higher values. The experimental results obtained on lines designed in accordance with the invention show that, in fact, the attenuation of the echos is very close to the theoretical value calculated from the absorption in the propagation medium and the conversion factors of the transducers. In accordance with a preferred design of the lines according to the invention, the transducers are of small dimensions in relation to those of the reflecting faces and are associated with point contacts of the type described in French Patent 2,094,443, applied for on June 22, 1970, by the Applicants. The positioning of the output transducer is fixed by the laws of geometrical optics. Practically the output conductor is positioned through scanning of the surface of the transducer with the aid of a movable contact mounted on a micromanipulator and connected to a measuring instrument.

According to a preferred variant of the invention, the improved multiple-reflection delay line structure utilizes the focusing properties of non-planar dioptric systems and a transverse shear mode of propagation along at least one part of the acoustic path.

Embodiments according to this variant have made it possible to reduce the losses as compared with those of lines producing the same delay and utilising exclusively the longitudinal mode of propagation by a value of about 15 dB in the particular case of a line made of yttrium and aluminum garnet which produces a delay of 60 $\mu$s at 2 GHz .

As well known, the reflection of a longitudinal wave on a plane surface is accompanied by a transformation of the mode of propagation. This phenomenon is clearly explained by W. P. Mason in his book "Physical Acoustics — Principles and Methods", Volume 1, part A, pages 492 ff., published by Academic Press, 2nd Edition, 1967. There even exists for a given material an angle of incidence for which the mode transformation is maximum, and for certain materials it may be total. It is also reciprocal.

The delay lines according to the present invention comprise at least the following elements:

a propagation volume consisting of a substantially isotropic material which has a lateral surface approximately cylindrical, a plane dioptric system at one of the ends of the axis of said cylinder, the symmetry axis of which cuts the axis of said cylinder, a non-planar dioptric focusing system situated close to the other end of the said axis of said cylinder, and having a focal length at least equal to the length of the acoustic path of the waves emanating from the transducer;

an input transducer which excites in the medium a longitudinal plane wave which is propagated in a direction which is different from that of larger dimension and which forms, with the said plane dioptric system, an angle of incidence corresponding to the maximum transformation of the incident longitudinal wave into a shear transverse reflected wave.

In accordance with modified embodiments, the volume has two plane dioptric systems and/or two non-planar dioptric focusing systems. These non-planar dioptric systems are preferably spherical.

DETAILED DESCRIPTION OF THE INVENTION

The invention will be readily understood from the following description and by reference to the accompanying figures, which are given by way of non-limiting example, and in which:

FIG. 1 diagrammatically illustrates a delay line according to the invention;

Figure 9:
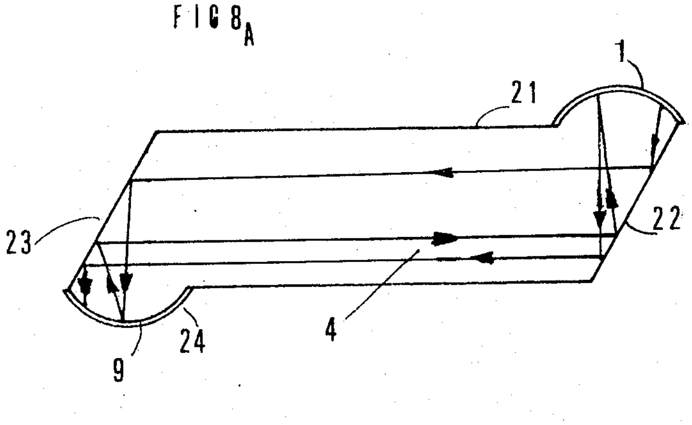
Figure 7B:
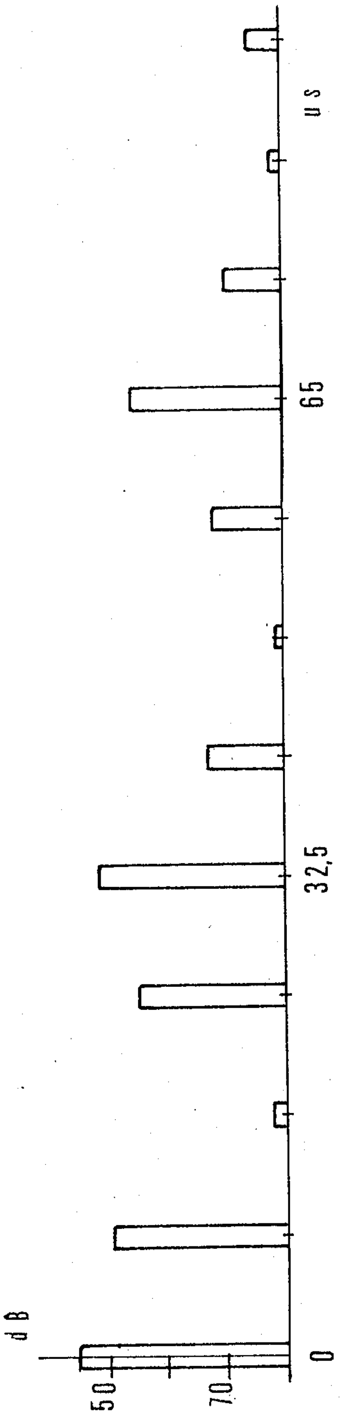
Figure 8B:
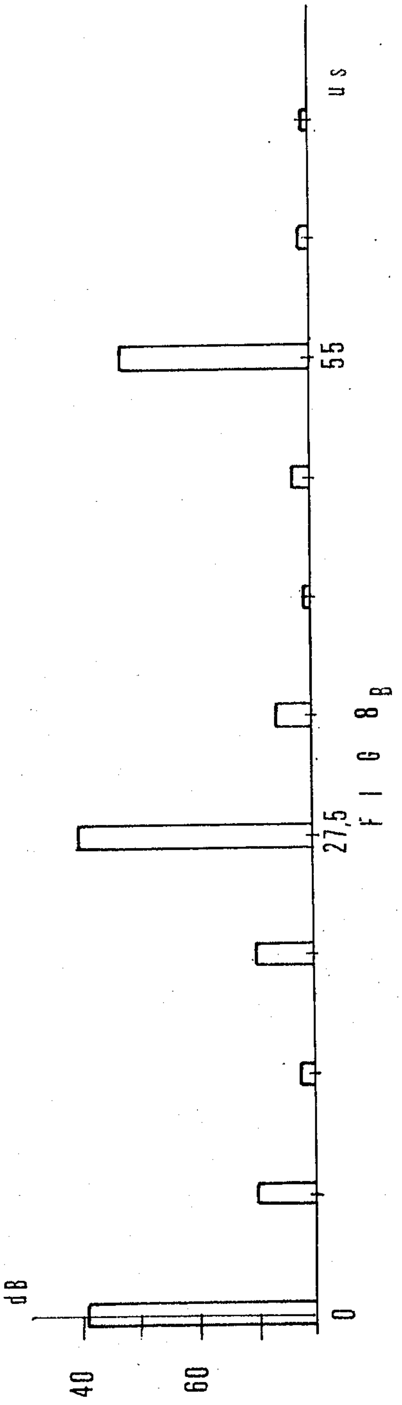

FIG. $8_A$ is another variant of a line according to the invention, the characteristics of which are apparent from FIG. $8_B$ and FIG. 9 is another variant of a line according to the invention.

Figure 1:
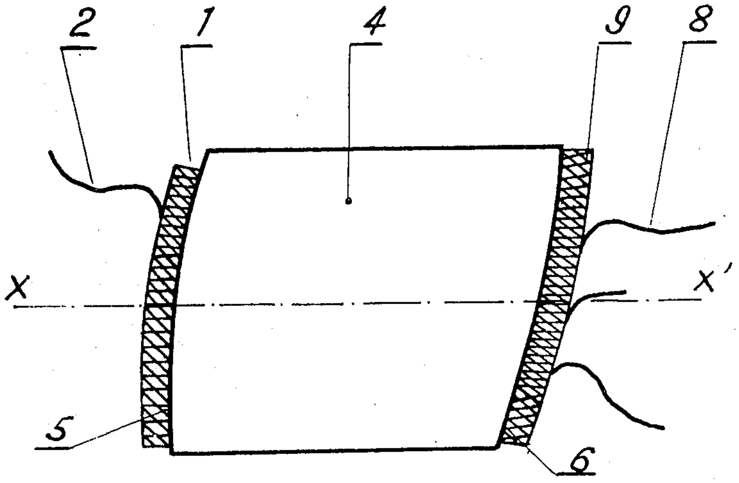

There is shown at 1 in FIG. 1 an input electroacoustic transducer connected by means of a conductor 2 to a microwave circuit (not shown). The acoustic energy is propagated in the medium 4, the input face 5 and the opposite face 6 of which spherical portions are domes consisting of spheres whose centers (not shown) define a straight line intersecting the axis of symmetry x–x' of the cylindrical portion, the centers not belonging to x–x'. The radii of the spheres corresponding to the domes 5 and 6 when they are made equal are substantially equal to four times the height of the cylinder 4, the axis of which is represented by x–x' and corresponds also to a crystallographic axis of the single crystal constituting the medium 4. In accordance with a variant, the faces 5 and 6 may consist of portions of a paraboloid of revolution whose focus is situated in the neighborhood of the other face and whose axis is offset in relation to x–x'. The energy transformed at 9 is transmitted by the connection 8 to the utilisation circuit.

Figure 2:
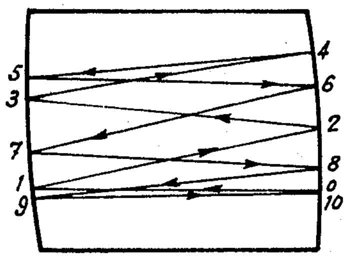
FIG. 2 illustrates the travel of the acoustic wave in the line of FIG. 1.

FIG. 2 illustrates the travel of the acoustic wave in a line according to the invention having characteristics as follows: the material is corundum, the geometrical length of the directrices is 4.5 cm, which corresponds to a delay of 4 $\mu$s for a single travel between the two reflecting faces 5 and 6 consisting of spherical portions or domes having a radius of 20 cm. The distance between the centers of the two spherical portions or domes is 0.5 mm; and the two centers are situated symmetrically about the axis x–x' of the cylinder but not on the axis. It will be observed that each spherical dioptric system does not contain the focus of the other one in this construction. However, the effect of concentration is considerable. Assuming that the input transducer is pointform and is located at the point 0, the points of successive reflection of the acoustic wave are numbered in the natural sequence 1, 2, 3, 4, . . . It will be seen that the point of impact of the beam at the second reflection is close to the point of excitation. For the sake of clarity, the tracing has not been continued beyond the tenth echo.

Figure 3:
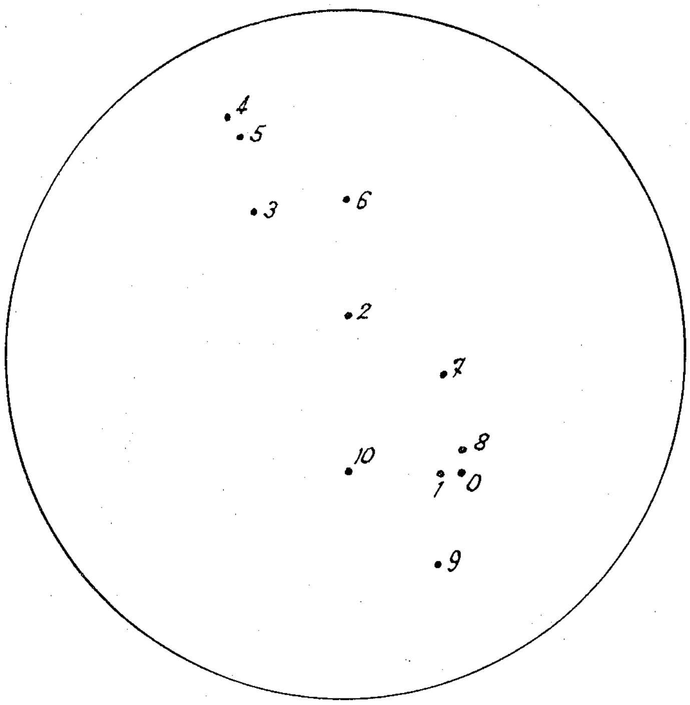
FIG. 3 illustrates a projection on a common plane of the points of reflection of the waves successively on each of the faces.

FIG. 3 illustrates a projection of the various points of impact of the acoustic beam on a plane perpendicular to the axis x–x' of the cylinder. As will be apparent, the successive points of impact of the acoustic beam are well separated. The solid-lined circle represents the zone of the two terminal faces covered by the transducers 1 and 9. These two zones are successively explored with the aid of a point contact such as 8 (metal strip on which bears the rounded end of a capillary tube consisting of insulating material such as glass). The other end of the metal strip is connected to a measuring instrument of the oscilloscope type synchronised by the input signals. The capillary tube is mounted on a micromanipulator controlled by the operator. The order of the echo can be identified from its delay. The point of impact is defined by the position of the capillary tube which corresponds to the maximum output signal displayed on the c.r.t. It will be observed that the points of impact are not aligned, which would be the case if the spherical portions were centered on the axis of symmetry x–x'. The results of the quantitative measurements made on this line are illustrated in FIG. 4 and set forth in Table 1.

Figure 4:
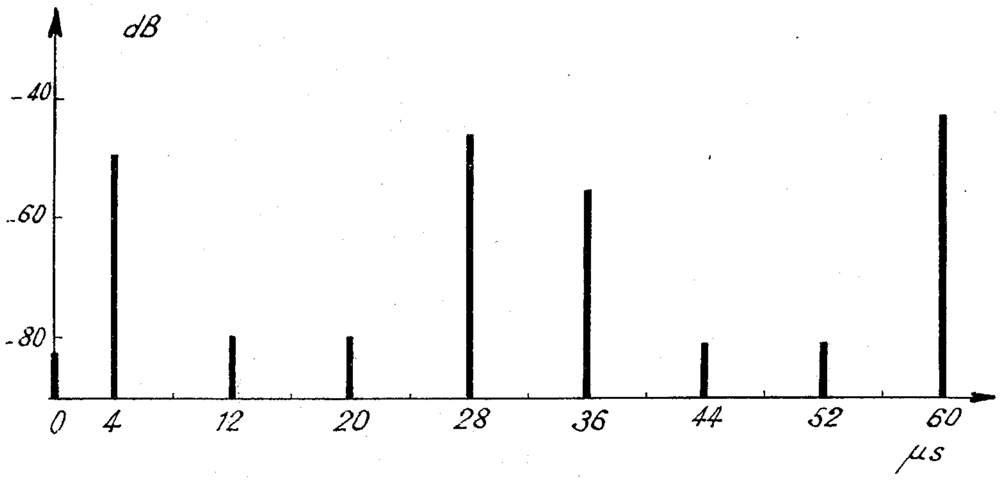
FIG. 4 illustrates the successive echos obtained with the aid of the line of FIG. 1.

FIG. 4 illustrates diagrammatically the oscillogram of the echos as a function of the delay collected as in the course of the exploration of the surface of the transducer 9 with the aid of a contact 8 whose position is controlled by means of the micromanipulator.

TABLE 1

| Delay in μs | 0 | 4 | 12 | 20 | 28 | 36 | 44 | 52 | 60 |
|---|---|---|---|---|---|---|---|---|---|
| Attenuation in dB | – 80 | – 49 | – 80 | – 80 | – 46 | – 55 | <– 80 | <– 80 | – 43 |

The attenuation of the fifteenth echo is limited to 43 dB. Table 2 sets out the measured values of the attenuation of the fifteenth echo in the frequency band 1 – 1.4 GHz. Table 1 corresponds to the measurements made at 1.3 GHz. As will be apparent, the delay line according to the invention has relatively low selectivity, the band 1 – 1.4 GHz being covered with a relative attenuation of less than ± 3 dB.

TABLE 2

| Frequency | Attenuation at 60 μs |
|---|---|
| 1 GHz | 44 dB |
| 1.1 GHz | 41 dB |
| 1.2 GHz | 42 dB |
| 1.3 GHz | 43 dB |
| 1.4 GHz | 47 dB |

Figure 5:
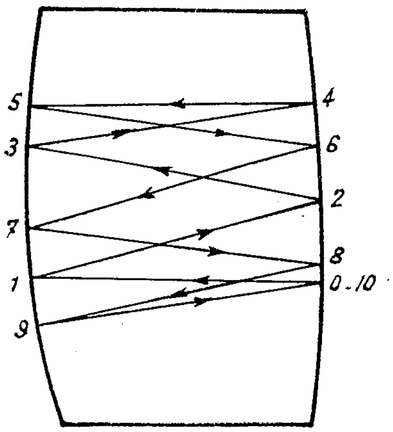
FIG. 5 illustrates a variant of the line according to the invention.

FIG. 5 illustrates the travel of the acoustic wave in a modified construction in which the radii of curvature of the two spherical dioptric systems are different. The material chosen is corundum, as before, and the length of the generatrices is the same as in the preceding example, i.e. 4.5 cm. The radius of the dome 5 is 15 cm and that of the dome 6 is 30 cm. The distance between the two centers, projected on to a normal to the axis x–x' is 2 cm. A spreading effect of the points of impact is also obtained.

Figure 6:
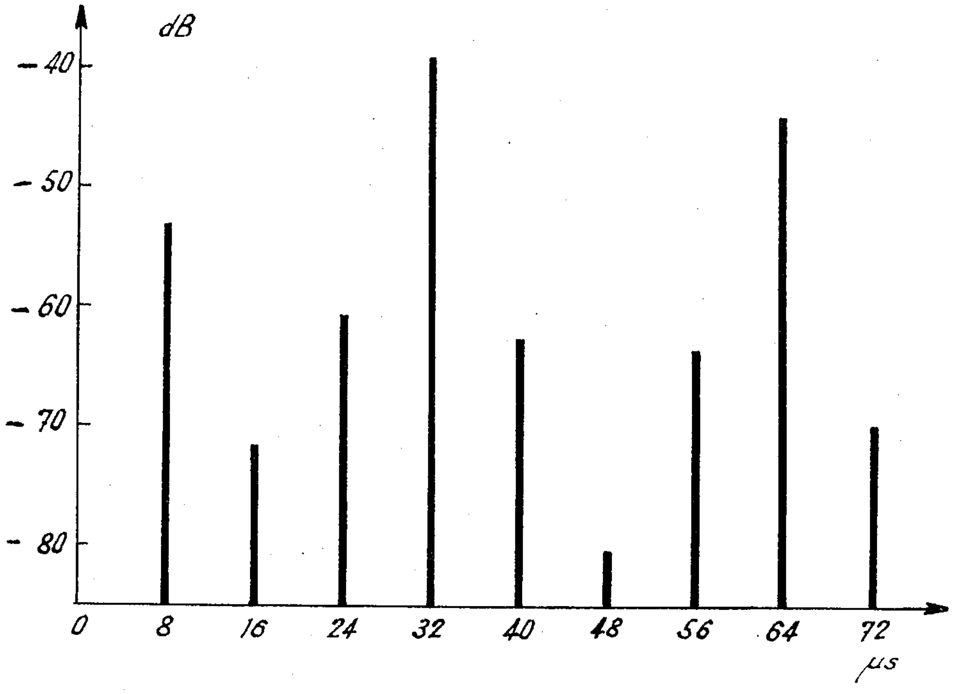
FIG. 6 is an oscillogram.

FIG. 6 illustrates the relative level of the successive echos obtained by exploration of the transducer 1 with the aid of a movable contact, as has been explained. The line has an attenuation of – 44 dB for a delay of 64 μs and of – 39 dB for a delay of 32 μs.

Figure 7A:
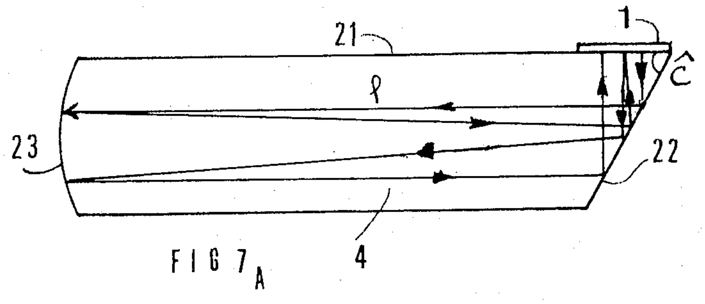
FIG. 7A is another variant of a line according to the invention using shear mode, the characteristics of which are apparent from FIG. $7_B$.
Figure 8A:
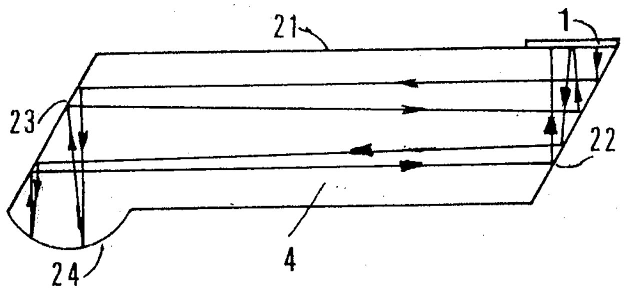

FIG. 7a diagrammatically illustrates a section of a line which is particularly simple to produce. As will be apparent, it comprises essentially an input transducer 1 situated on a plane face 21 of a medium 4 serving for the propagation and exciting in this medium a plane acoustic wave directed from the top downwards along the vertical. The medium 4 which is of generally cylindrical form in the horizontal direction, has a first plane terminal face 22 inclined in relation to the plane face 21 at a given angle, the mode of determination of which will be explained in the following. The inclination of the face 22 is so chosen that the reflection of the plane wave thereon is accompanied by a maximum transformation of the longitudinal wave into a shear mode wave. The second terminal face of the propagation medium 4 consists of a non-planar dioptric system 23, for example of spherical form. The focal length of the dioptric system is so chosen as to compensate, at the reflection, for the spotaneous effect of diffraction of the acoustic energy in the medium. The focusing is effected on the energy which is propagated in accordance with the shear mode. It will hereafter be explained how this condition can be satisfied in the case of a particular example.

There are set out in Tables 3 and 4 the attenuation and selectivity characteristics of a particular line consisting of yttrium-aluminum garnet of mean length $i$ = 15 mm and of angle $C = 59° 34' 5''$, of which the dioptric system 23 has a radius of 35 mm. The results given in Table 3 were measured at 1.5 GHz. Those given in Table 4 were measured on the echo having a delay of 60 μs.

FIG. $7_B$ represents the values of Table 3, i.e. the relative level of the successive echos.

TABLE 3

| Delay in μs | Attenuation in dB |
|---|---|
| 15 | – 50 |
| 30 | – 60 |
| 45 | – 55 |
| 60 | – 47 |
| 75 | – 57 |

TABLE 4

| F in GHz | Attenuation in dB |
|---|---|
| 1.3 | – 50 |
| 1.4 | – 48 |
| 1.5 | – 47 |
| 1.6 | – 48 |
| 1.7 | – 58 |

The variant illustrated in FIG. $8_A$ utilises a double mode transformation and a focusing of the longitudinal wave. As will be apparent, as in the case of FIG. $7_A$ the line operates by reflection, that is to say, transducer 1 effects both the transformation of the electrical energy into acoustic energy and the reciprocal transformation. The transducer 1 is disposed on one of the large plane faces 21 of the medium 4. The inclined face 22 effects as before a maximum transformation of the longitudinal acoustic wave into a transverse shear mode wave which is propagated as far as the second terminal face 23, the angle of inclination of which is so chosen that, by reflection, the shear wave is transformed into a longitudinal wave with maximum yield. The latter wave is thereafter reflected on the non-planar dioptric system 24 occupying a portion of the second large face of the propagation medium. The focal length of this dioptric system is so chosen that the focal plane is situated in the neighborhood of the plane of the transducer or beyond the latter, so as to benefit in the plane of the transducer by the focusing effect supplied by 24.

Tables 5 and 6 give the attenuation characteristics as a function of the rank of the echo and of the frequency of a line according to FIG. $8_A$ designed to produce a delay of 60 $\mu$s at 1.5 GHz.

TABLE 5

| Delay in $\mu$s | Attenuation in dB |
|---|---|
| 15 | −55 |
| 30 | −65 |
| 45 | −57 |
| 60 | −45 |
| 75 | −60 |

TABLE 6

| F in GHz | Attenuation in dB |
|---|---|
| 1.3 | −48 |
| 1.4 | −46 |
| 1.5 | −45 |
| 1.6 | −47 |
| 1.7 | −50 |

FIG. $8_B$ shows the values of Table 5, that is to say, the relative level of the successive echos.

The variant of FIG. 9 corresponds to a propagation medium having two plane dioptric systems 22 and 23 respectively and two non-planar dioptric systems 21 and 24 respectively and operating in transmission. The input transducer is disposed on the non-planar dioptric system 21 and the output transducer 9 is disposed on the dioptric system 23.

Table 7 shows the attenuation characteristic of a line operating at 1.5 GHz and effecting a delay of 60 $\mu$s.

TABLE 7

| Delay in $\mu$s | Attenuation in dB |
|---|---|
| 8 | >−80 |
| 16 | −58 |
| 24 | −52 |
| 32 | >−80 |
| 40 | >−80 |
| 48 | −56 |

In order to facilitate the selection of an echo of high rank, it is advantageous to avoid superposition of the echos of successive ranks on the same point of the transducer. It may be advantageous to this end to use the mean already described in the aforesaid patent application filed by the applicants for "Long-delay electroacoustic line structure". This means consists essentially in utilising a point contact between the electric circuits and the transducer or transducers and scattering the echos on the output surface of the transducer, using non-planar dioptric systems whose axes of symmetry are inclined in relation to the direction of the axis of the elongate portion of the volume in which the propagation takes place. The point contact may be formed from a conductive strip and a mechanical insulating element serving to define the point of contact. As is mentioned in the aforesaid patent application, this element may be a capillary having a rounded end, the position of which is experimentally defined with the aid of a micromanipulator under the control of an operator having at his disposal a device for the visual display of the electric signal picked up by the conductive strip.

The mode of calculating the angle of inclination C of the plane dioptric system such as 21 (FIG. $7_A$) and 23 (FIG. $8_A$) and the focal length of the non-planar dioptric systems may be described by means of an example. The material chosen is an yttrium-aluminum garnet conforming to the formula $Y_3Al_5O_{12}$. The components of the tensor of elasticity $C_{ij}$ can be ascertained by a physical study of the elastic characteristics of this material. Calculation of the anisotropy factor given by the formula $$Y = \frac{2C_{44}}{C_{11} - C_{12}}$$

gives a value of 1.03, which means that the material can be regarded as isotropic. Under these conditions, Lewis has shown in an article in "Electronic Letters", Vol. 8, March 1972, page 131, that the angle of incidence B corresponding to a total transformation of the longitudinal wave into a transverse shear wave is given by the formula $$B = \arctan\left(\frac{C_{11}}{C_{44}}\right)^{1/2} = \arctan\frac{V_1}{V_s}$$

where $V_1$ and $V_s$ are the velocities of propagation of the longitudinal mode and of the transverse shear mode respectively. In the example chosen, it is found that $B = 59° 34'$.

Snell's relation $$\frac{\sin A}{V_s} = \frac{\sin B}{V_1} \text{ (see Mason loc. cit. p. 493)}$$

can be used to determine the angle A of reflection of the shear wave. It is found that $A = 30° 24'$. It will be seen that the sum $A + B = 89° 58'$, that is to say very substantially a right angle. The path of the acoustic wave which has been traced in the preceding figures is therefore justified.

The determination of the focal length of a spherical dioptric system makes it possible to define the radius of the sphere which is the principal parameter defining non-planar dioptric systems such as 23 (FIG. $7_A$) of the described structures. The condition aimed at is that the elastic energy should be concentrated in the neighbourhood of the plane of the transducer or beyond it, in order that the spontaneous diffraction of the acoustic wave may be compensated for. The duration of the travel of the acoustic waves within the propagation medium is known, since the velocities of propagation of each of the modes is known. By application of the laws of geometrical optics (Fermat's principle, stationnary path length), it is possible to define the acoustic length. It must be at most equal to the focal length of the dioptric system in order that the effect of concentration may exist. The position of the center may be chosen on the axis of the elongate fraction of the propagation medium or slightly outside this axis, as has been explained.

It is to be understood that yttrium-aluminum garnet is only an example of a material that can be used in the construction of the lines according to the invention.

What we claim is:

1. A multi-reflection electroacoustic delay line comprising:

a. an acoustic propagation medium of generally cylindrical shape terminated by two end faces for propagating the acoustic wave therebetween;

b. at least one transducer for launching acoustic energy into said medium; and c. at least one of said end faces having a symmetry axis cutting the longitudinal symmetry axis of said cylindrically shaped medium and at least one reflecting and focusing face provided on the surface of said medium.

2. A multi-reflection electroacoustic delay line according to claim 1 in which said at least one end face and at least one focusing reflecting face are substantialy spherical portions, the centers of which are located off the longitudinal symmetry axis of said substantially cylindrical acoustic medium and the radii of said spherical portions are approximately double the length of the acoustic path between said transducer and the apex of said end face, said at least one transducer being located on one end face.

3. A multi-reflection electroacoustic delay line according to claim 1 in which both end faces are focusing reflecting faces of substantially spherical portion shape, both the centers of said portions being located off the longitudinal symmetry axis of said substantially cylindrical acoustic medium, said at least one transducer is located on the first end face and the radius of the second end face approximates double the length of the acoustic path between said transducer and the apex of the second end face.

4. A multi-reflection electroacoustic delay line according to claim 1 in which at least the first of said end faces is planar and a perpendicular to said planar end face cuts the longitudinal symmetry axis of said substantially cylindrical medium, said at least one transducer is located at the lateral surface of said propagating medium and the said reflecting and focusing face is a substantially spherical portion located on the surface near said planar end face, the center of said portion being located within the symmetry plane of the assembly comprising said medium and said transducer.

5. A multi-reflection electroacoustic delay line according to claim 1 in which both end faces are planar with perpenidculars cutting the longitudinal symmetry axis of said generally cylindrical medium, said at least one transducer is located on the focusing and reflecting face of said medium which is a sphere shaped boss portion located at the vicinity of one of the end faces, the center of said boss being located within the symmetry plane of the assembly consisting of said medium and said transducer and the radius of said boss approximating the double of the length of the acoustic path between said transducer and said focusing reflecting boss.

6. A multi-reflection electroacoustic delay line according to claim 1 in which both end faces are planar with perpendiculars cutting the longitudinal symmetry axis of said medium and two reflecting focusing faces comprising sphere shaped boss portions are located respectively at the vicinity of each of said end faces, the center of said boss portions being located within the symmetry plane of the assembly comprising said medium and said at least one transducer, said at least one transducer being located on one of said bosses.

* * * * *